(12) United States Patent
Winter

(10) Patent No.: US 11,041,719 B1
(45) Date of Patent: Jun. 22, 2021

(54) DIRECTIONAL UTILITY LOCATION MARKER

(71) Applicant: Lynn A. Winter, Bloomington, MN (US)

(72) Inventor: Lynn A. Winter, Bloomington, MN (US)

(*) Notice: Subject to any disclaimer, the term of this patent is extended or adjusted under 35 U.S.C. 154(b) by 0 days.

(21) Appl. No.: 16/501,333

(22) Filed: Mar. 27, 2019

(51) Int. Cl.
*G01C 15/04* (2006.01)
*G01V 15/00* (2006.01)
*G01C 15/06* (2006.01)

(52) U.S. Cl.
CPC ............ *G01C 15/04* (2013.01); *G01C 15/06* (2013.01); *G01V 15/00* (2013.01)

(58) Field of Classification Search
CPC ......... G01C 15/04; G01C 15/06; G01V 15/00
See application file for complete search history.

(56) References Cited

U.S. PATENT DOCUMENTS

| | | | | |
|---|---|---|---|---|
| 343,365 A * | 6/1886 | Daniels | ................... | G09F 7/18 40/607.06 |
| 400,364 A * | 3/1889 | Sanderson | ................... | G09F 7/08 40/620 |
| 427,394 A | 5/1890 | Brown | | |
| 482,062 A | 9/1892 | McBroom | | |
| 484,902 A * | 10/1892 | Smith | ................... | G09F 3/16 40/659 |
| 828,542 A * | 8/1906 | Ellis | ................... | D06F 55/00 24/545 |
| 879,493 A * | 2/1908 | Robinson | ................... | G09F 3/16 40/659 |
| 1,435,178 A * | 11/1922 | Rolph | ................... | G09F 3/12 40/651 |
| 1,537,237 A * | 5/1925 | Kaestner | ................... | B05B 15/622 248/87 |
| 1,590,722 A * | 6/1926 | Brakmeier | ................... | G09F 3/12 40/645 |
| 1,616,147 A * | 2/1927 | Smiley | ................... | G09F 3/12 40/645 |
| 1,712,028 A * | 5/1929 | Cromie | ................... | G01C 15/06 52/103 |
| 1,916,305 A * | 7/1933 | Esselen | ................... | A01G 9/122 47/47 |
| 2,181,977 A | 12/1939 | Magovern | | |
| 2,229,527 A * | 1/1941 | Schouman | ................... | A01G 9/122 47/47 |

(Continued)

*Primary Examiner* — Nimeshkumar D Patel
*Assistant Examiner* — Tania Courson

(57) ABSTRACT

A flag type warning marker consisting of two parts—a flag supported by a uniquely shaped flagstaff to be inserted into the ground directly above underground utility lines to mark their location. By the unique shape of the flagstaff, the marker also indicates the direction or path of the utility lines. The flagstaff includes one C-shaped offset segment projecting outwardly from the vertical flagstaff in the direction of the associated utility lines path. In another embodiment of the invention, there are two separate offset segments oriented at ninety degrees to one another to designate a ninety degree corner of the utility lines below. Another offset segment of the flagstaff near the lower end of the staff can be added and be partially embedded into the ground to anchor the marker in order to prevent it from rotation after installation, thus maintaining the integrity of the directional indication.

11 Claims, 2 Drawing Sheets

(56) References Cited

U.S. PATENT DOCUMENTS

| | | | | |
|---|---|---|---|---|
| 2,413,905 | A | * | 1/1947 | Blackburn ............ G01C 15/06 116/173 |
| 2,426,443 | A | * | 8/1947 | Fetterman ............. A01G 9/122 47/47 |
| 2,536,341 | A | * | 1/1951 | Asher ................... B05B 15/622 248/87 |
| 2,639,524 | A | * | 5/1953 | Irving ....................... G09F 3/12 40/645 |
| 2,894,706 | A | * | 7/1959 | Cappio ................... F16L 3/003 248/87 |
| 2,967,712 | A | * | 1/1961 | Breitenfeldt ............... F41J 7/04 273/388 |
| 3,009,437 | A | * | 11/1961 | Hollinger ................ E04H 12/20 116/209 |
| 3,204,355 | A | * | 9/1965 | Whitman ................... G09F 7/00 40/660 |
| 3,503,163 | A | | 3/1970 | Lutz |
| D247,265 | S | * | 2/1978 | Ledebuhr ....................... D20/43 |
| 4,127,972 | A | * | 12/1978 | Reimoser ................ G01C 15/04 33/293 |
| 4,196,533 | A | | 4/1980 | Kamphausen |
| 4,290,712 | A | * | 9/1981 | Hayes .................... E01F 9/608 256/1 |
| D261,875 | S | * | 11/1981 | Anderson .................... D11/181 |
| 4,441,288 | A | | 4/1984 | Feldman et al. |
| D274,412 | S | * | 6/1984 | Anderson ...................... D10/66 |
| D282,711 | S | * | 2/1986 | Nelson ............................. D8/1 |
| 4,649,678 | A | * | 3/1987 | Lamson ............... E01F 15/0469 248/530 |
| 4,738,060 | A | | 4/1988 | Marthaler et al. |
| 4,852,512 | A | | 8/1989 | Klatt |
| 4,991,536 | A | | 2/1991 | Moshofsky |
| 5,056,454 | A | * | 10/1991 | Turner ................... G01C 15/02 116/209 |
| 5,101,755 | A | | 4/1992 | Barrett |
| 5,174,237 | A | | 12/1992 | Beard |
| 5,242,247 | A | * | 9/1993 | Murphy ................. E02F 5/145 248/49 |
| 5,247,900 | A | * | 9/1993 | Sobczak ................ G09F 17/00 116/173 |
| D358,628 | S | * | 5/1995 | Lenort ......................... D22/108 |
| 5,568,785 | A | * | 10/1996 | Hazen ................ E04H 12/2215 116/209 |
| D409,458 | S | * | 5/1999 | Brown ............................. D8/1 |
| 6,053,260 | A | | 4/2000 | Boon et al. |
| 6,095,081 | A | | 8/2000 | Gochenour |
| 6,195,926 | B1 | * | 3/2001 | Jarl ............................ G09F 3/08 248/87 |
| 6,286,450 | B1 | | 9/2001 | Murrin et al. |
| 6,527,246 | B1 | * | 3/2003 | Stinnett .................... F16L 1/06 248/530 |
| 6,578,512 | B2 | * | 6/2003 | Truax .................... G01C 15/04 116/209 |
| 7,025,016 | B1 | * | 4/2006 | Landes ................ E04H 12/223 116/209 |
| 7,275,341 | B1 | * | 10/2007 | Kincaid ................... G09F 3/12 40/645 |
| 7,451,721 | B1 | | 11/2008 | Garza et al. |
| 7,527,109 | B2 | * | 5/2009 | Barker ...................... E21B 7/18 116/205 |
| D617,157 | S | * | 6/2010 | Eacker ............................ D8/1 |
| 7,930,859 | B1 | * | 4/2011 | Eslambolchi ........... E01F 9/629 248/159 |
| 7,992,754 | B1 | * | 8/2011 | Carrette ................... B25C 1/02 227/120 |
| D662,003 | S | * | 6/2012 | Hirschhorn ............... D10/109.1 |
| 9,809,992 | B1 | | 11/2017 | Barlow |
| 2002/0073915 | A1 | | 6/2002 | Howard |
| 2013/0186323 | A1 | * | 7/2013 | Oberg ................ G09F 17/0091 116/174 |
| 2014/0216328 | A1 | * | 8/2014 | Seibert ................... G01C 15/04 116/209 |

* cited by examiner

DIRECTIONAL UTILITY LOCATION MARKER

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to underground utility location programs and methods, and more particularly to temporary, disposable flag markers that indicate the location of subsurface utility lines, the direction of utility lines, and the type of utility installation.

BACKGROUND OF THE INVENTION

In the utility industry, significant resources are provided to maintain records of subsurface utility locations and to protect valuable underground utility lines from damage by excavating equipment and other nearby soil disturbance activities subsequent to the initial installation of these utilities. When construction activities are anticipated in the area of underground utilities, utility companies arrange for crews to visit the site and provide temporary markings to designate the location and type of utility facilities that could be damaged by the planned construction. These utility location programs are necessary and justified in order to ensure that utility lines are not damaged, service is not interrupted, and dangerous situations are avoided. Such programs are costly both for the utility companies and the construction companies, but are necessary and accepted throughout the industry. To locate subsurface utility lines, it is generally necessary to travel to the site, locate existing survey monuments or property line markers, and use available utility location records to measure from the monuments to determine the location of the utility lines. In some instances, electronic signals can be imparted to the underground lines and detected at the ground surface to indicate the presence and location of the lines.

Typically, temporary, disposable flag markers are employed to mark the location and type of subsurface utility lines for the duration of the associated construction project in the nearby area. These flag markers are also used to mark lines, borders, trails, or points wherever highly visible, above-ground marker(s) are needed. As these flag markers generally do not provide indication of the direction of the utility lines, paint markings are frequently added at the ground surface to supplement the flag markers and show the direction of the underground lines. These paint markings are often unsightly and may not endure for the length of the construction activities, especially in situations where the ground surface may be intermittently blanketed with grass, snow, sand or other surface conditions that can change quickly, thus obliterating the paint markings. In order to remain effective, the paint may have to be reapplied due to changing ground surface conditions. At other times, especially on concrete surfaces, the unsightly paint may last well beyond the needed application period. Without the supplemental paint markings to indicate the direction of the lines, the accuracy and effectiveness of the marking system is greatly reduced.

Despite the considerable efforts and expenses allocated to maintaining records of subsurface utility locations and protecting these facilities from damage in the years subsequent to the initial installation, underground utilities do often suffer damage, and major accidents do occur due to mistakes and the limited capability of existing programs for protecting utilities throughout their life. There is a general recognition throughout the utility industry that practical improvements are needed, especially for utilities that pose potential problems for major outages or tragic accidents.

Although a variety of underground utility location markers have been developed, there has always remained a recognized need for a more practical, effective temporary utility marker for use during periods of excavation in the utility line area. Over the years, a wide variety of markers have been implemented. One of the most common temporary markers to be used is the ubiquitous flag marker consisting of nothing more than a small flag supported by a steel or plastic rod inserted into the ground. These flags typically have indicia and a distinct color or pattern to designate the specific company owner of the marked utility.

An example of a more complex underground utility location marker is U.S. Pat. No. 6,095,081 issued to Gochnour that discloses a marker including an elongated casing and a rod received in the casing. This rod is selectively movable between a lowered storage position and a raised warning position where it is visible during excavation activities in the nearby area. It also provides information on the direction and distance to the next adjacent marker. This complex marker is more appropriate in situations where a permanent marker is justified, but is too impractical and expensive to be employed as a temporary, disposable utility marker. Furthermore, the rod, in its raised position, is not as visible or noticeable as the flag of a typical flag marker. A utility marker of this type would often be unsuitable for installation in a roadway or other paved area.

Another example of a temporary, disposable marker is U.S. Pat. No. 5,174,237 issued to Beard which discloses a grade marker having a flag or feather made of a bundle of stiff, resilient strands, a wood peg, and at least one staple within which the feather is located. While this device is utilized as a temporary disposable marker, it is not as convenient to install and remove as a common flag marker, and it provides only location and grade information. No directional information or other information is included. It lacks the versatility to be used as an effective underground utility location marker.

BRIEF SUMMARY OF THE INVENTION

In view of the foregoing discussion of the importance of utility marking programs, and especially the markings utilized to protect buried utility lines during temporary nearby construction activities, a more versatile, inexpensive temporary, disposable flag marker is needed that has the capability to indicate the presence of underground utility lines and their type, but also the direction of these lines. The marker should provide the necessary directional information without the need to resort to supplemental applications of paint to provide directional markings at the ground surface. Considering the disadvantages of the prior art, there is a need for a more versatile, practical temporary, disposable underground utility location marker that introduces new and significant advantages and overcomes the drawbacks of presently available markers by attaining the following objectives:

(a) A simple two-part marker consisting of a flag having indicia and a supporting rod to be inserted into the ground at the underground utility location.

(b) A marker that is appropriate for temporary use and is disposable.

(c) A marker that can be easily and inexpensively manufactured.

(d) A marker that is versatile providing location information, directional information, utility type information, and owner company information. A marker that is also useful to mark non-utility locations, such as lines, borders, trails, or points.

(e) A marker that can show the angle configuration of the underground utility lines where the lines change direction.

(f) A marker that has a highly visible flag having indicia and a recognizable color or pattern corresponding to a particular type of utility and owner of that utility.

(g) A marker that is sized and shaped to be convenient to use, yet is effective and readily noticeable.

(h) A marker that can be easily and conveniently installed and removed when no longer needed.

(i) A marker that is sufficiently durable to last for the duration of a typical construction project without the need for the marker to be replaced frequently.

The present invention is a simple two-part directional underground utility marker that is inserted into the ground directly above underground utility lines. It is designed to be used temporarily during excavation activities in the area of the subsurface utility lines, and it is inexpensive to the degree that it is considered to be consumed during use and thus disposable. The utility marker comprises an easily visible flexible flag securely attached to an upright staff. The flag can be of various shapes, and flexible materials such as plastic, vinyl, nylon, polyester, rayon or cotton. The flag can have indicia to define the type of utility lines, the owner company or other useful information regarding the associated utility lines. The flag can also have a designated color or pattern to indicate the type of utility lines. The flag is attached at the upper portion of a staff support. The staff is typically an elongated rod-shaped member. The length of the staff can vary depending on the intended use and the type of ground cover such as tall grass or deep snow. The staff can be composed of spring steel or other metal. Various plastics or nylon may also be selected for the staff. The cross-sectional shape of the staff is preferably circular, but may be of other configurations as well.

The staff of the present invention is uniquely shaped or bent to produce either one or two directional projections or offsets to designate either one or two directions. A one-direction staff is to be used over a straight utility line, while a two-direction staff is to be used at a point directly above a utility line corner. A directional offset can be arcuate shaped or angular shaped. Another offset projection can be included to be embedded into the ground to serve as an anchor offset to prevent the marker from rotation, thus maintaining the directional integrity of the marker after installation. One embodiment of the invention includes a directional offset projection that is partially embedded in the ground. The upper above-ground segment of this directional offset provides directional indication, and the below-ground segment serves as an anchor to prevent the marker from rotation after installation.

Those two-direction embodiments include, an arcuate, circular or angular directional offset disposed below the flag, and a directional angle pointer that is a substantially horizontal segment with a bend at the top of the staff to provide a directional indication that is at an angle relative to the directional offset below the flag. The directional offset and the directional angle pointer are manufactured to be at ninety degrees (angle A) to one another in order to define a point above a ninety degree corner in the associated utility lines. This ninety degree angle can be adjusted by the user by bending the directional angle pointer to the desired angle at the installation site in order to correspond to some angle (other than ninety degrees) of the utility line corner. The primary purpose of the directional offset and the directional angle pointer is to indicate the direction or corner configuration of the utility lines, while eliminating the need for application of supplemental unsightly paint markings on the ground surface. Another objective of having an anchor offset embedded into the ground is to prevent rotation of the marker and the consequent compromising of the accuracy of the directional information after installation.

These and other objects, features, aspects, and advantages of the invention will become better appreciated and more clearly understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit and scope thereof, and the embodiments of the invention are intended to include all such modifications.

DRAWING REFERENCE NUMERALSS OF THE ELEMENTS
Elements

| | | | |
|---|---|---|---|
| 10 | directional utility location marker | 18 | straight segment |
| 12 | staff | 20 | directional offset |
| 14 | flag | 22 | anchor offset |
| 16 | indicia | 24 | directional angle pointer |

DETAILED DESCRIPTION OF THE INVENTION

The examples used herein are intended merely to facilitate an understanding of the ways in which the various embodiments of the invention may be practiced and to further enable those having skill in the art to practice the principles and concepts of the invention. Accordingly, the examples given should not be construed as limiting the scope of the invention.

Figure 1:
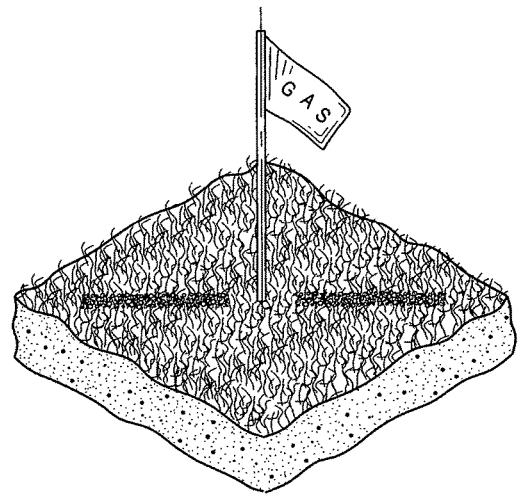
FIG. 1 is an upper perspective view of a typical prior art flag type underground utility marker inserted into a grass-covered ground surface. The supplemental horizontal paint markings to indicate utility line direction are also shown.
Figure 2:
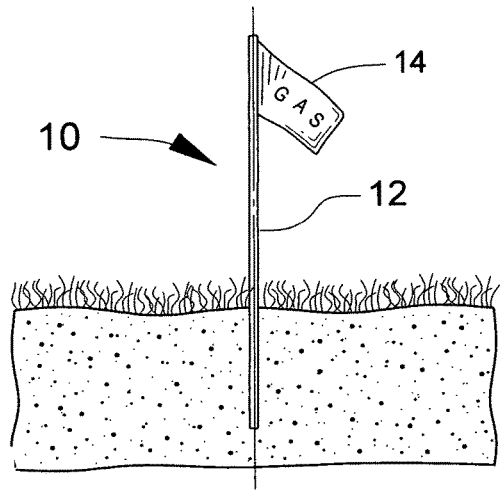
FIG. 2 is a side elevation view of the prior art marker of FIG. 1.
Figure 3:
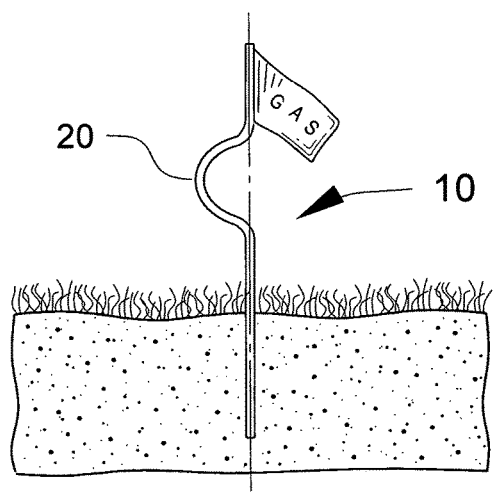
FIG. 3 is a side elevation view of the invention including one arcuate shaped directional offset.
Figure 4:
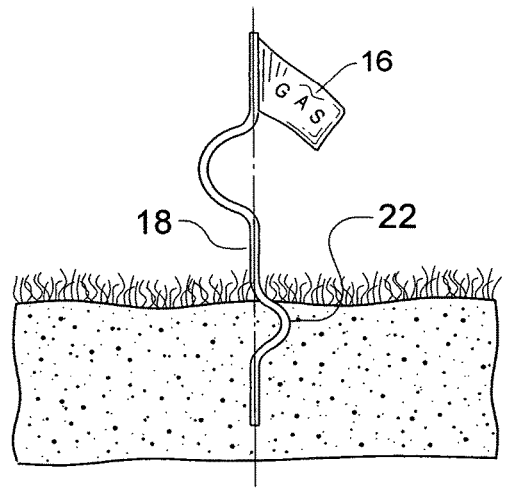
FIG. 4 is a side elevation view of the invention including one arcuate shaped directional offset and one arcuate anchor offset.

Reference is now made to the drawings wherein like numerals designate like parts throughout. Reference is made first to FIGS. 1 and 2 which show a common prior art example of a flag type marker utilized as an underground utility marker intended to be inserted into the ground above an underground utility line temporarily while excavation is taking place in the nearby area. When using this type of utility marker, supplemental paint markings are also needed to designate the direction of the utility lines as shown on the grass markings of FIG. 1. Flag type underground utility location markers provide a highly visible warning of the presence of and the type of subsurface utility lines to those who could potentially damage the lines in performance of excavation activities. In addition to marking underground utility lines, these flag markers can also be used to mark various other non-utility lines, borders, trails, or points wherever highly visible, above-ground marker(s) are needed.

FIGS. 3-6 show the present invention as a simple two-part directional utility location marker 10 that is inserted into the ground directly above underground utility lines to designate the straight line direction corresponding to the underground utility lines. FIGS. 7-16 define the corner orientation of the underground lines where they change direction. Marker 10 is designed to be used temporarily during excavation or other construction activities in the nearby area of the subsurface utility lines. Marker 10 is inexpensive to manufacture to the degree of being considered to be consumed during use and thus disposable. Marker 10 comprises an easily visible flexible warning flag 14 securely attached to an upright staff 12. Flag 14 can be made in various shapes and of various materials, such as plastic, vinyl, nylon, polyester, rayon, or cotton. Flag 14 can be made of flexible material or can be rigid. Flag 14 can have indicia 16 to designate the type of utility lines to be marked, the owner company, or any other useful information. Flag 14 can also have a unique color or pattern to designate a specific type of utility lines or the specific owner company of the utility. Flag 14 is securely attached to the upper portion of staff 12. Staff 12 is preferably an elongated rod-shaped substantially vertical member having at least one straight segment 18. The length of staff 12 can vary depending upon the intended use and the type of soil conditions and ground cover. For example, a longer staff 12 may be needed where the ground cover consists of tall grass or deep snow. Staff 12 can be composed of spring steel or other inexpensive metal. Various plastic materials, fiberglass or nylon may also be selected. The cross-sectional shape of staff 12 is preferably circular but may be triangular, rectangular, or other configurations also.

Staff 12 is uniquely shaped or bent in various embodiments of the invention to produce either a one-directional or a two-directional configuration. A one-directional staff 12 has a directional offset 20 disposed below flag 14. A two-directional staff 12 has a directional offset 20 disposed below flag 14, and also a directional angle pointer 24 that is a substantially horizontal segment of staff 12 disposed above flag 14, formed by a bend in staff 12. Two-directional staff 12 is shown on FIGS. 7-16 of the drawings. Marker 10, where having a one-directional staff 12, is to be used over straight line utility lines, and marker 10, where having a two-directional staff 12, is to be used over a corner or change in direction of the underground utility lines. Directional offset 20 and directional angle pointer 24 point at ninety degrees (angle A of FIGS. 14-16) to one another in order to designate a ninety degree corner of the associated subsurface utility lines. This ninety degree angle can be modified by the user by bending directional angle pointer 24 to any desired angle at the installation site in order to correspond to some angle (other than ninety degrees) of the associated underground utility lines corner or change of direction.

Figure 5:
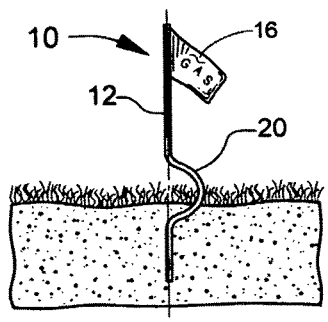
FIG. 5 is a side elevation view of the invention including one arcuate shaped directional offset wherein the embedded segment of the offset also serves as an anchor to prevent rotation of the marker.
Figure 6:
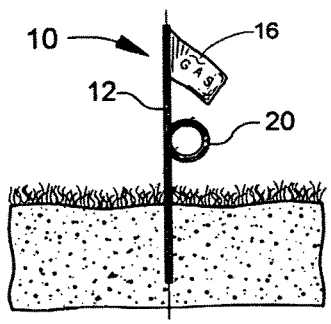
FIG. 6 is a side perspective view of the invention including a circular shaped directional offset.
Figure 7:
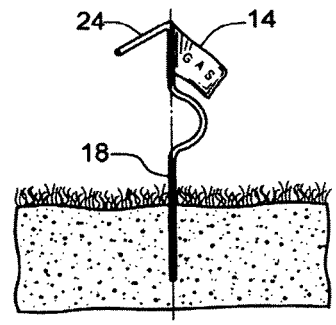
FIG. 7 is a side perspective view of the invention including an arcuate shaped directional offset and a horizontal top directional angle pointer.
Figure 8:
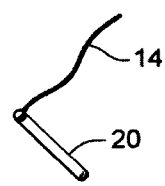
FIG. 8 is a top view of the invention according to FIG. 5.
Figure 9:
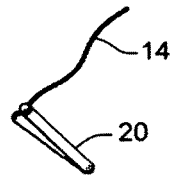
FIG. 9 is a top view of the invention according to FIG. 6.
Figure 10:
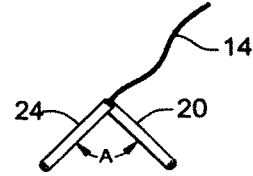
FIG. 10 is a top view of the invention according to FIG. 7.
Figure 11:
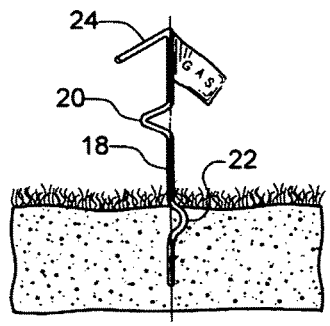
FIG. 11 is a side perspective view of the invention including one angular shaped directional offset, one arcuate anchor offset, and one horizontal top directional angle pointer.
Figure 12:
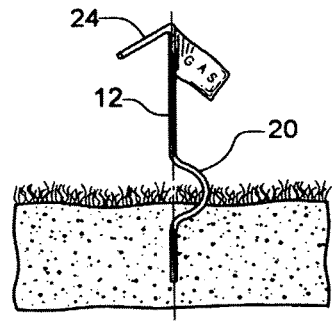
FIG. 12 is a side perspective view of the invention including one arcuate shaped directional offset wherein the embedded segment of the offset also serves as an anchor to prevent rotation of the marker, and a horizontal top directional angle pointer.
Figure 13:
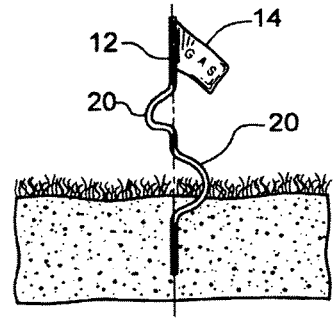
FIG. 13 is a side perspective view of the invention including an upper arcuate shaped directional offset and a second lower arcuate shaped directional offset wherein the embedded segment of the second offset also serves as an anchor to prevent rotation of the marker.
Figure 14:
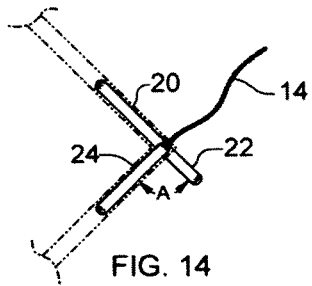
FIG. 14 is a top view of the invention according to FIG. 11.
Figure 15:
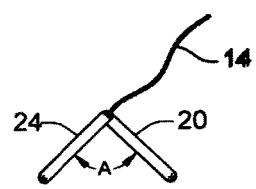
FIG. 15 is a top view of the invention according to FIG. 12.
Figure 16:
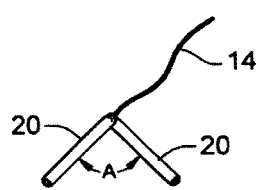
FIG. 16 is a top view of the invention according to FIG. 13.

An anchor offset 22 can also be included to be inserted into the ground to prevent rotation of marker 10 after installation, thus maintaining the directional integrity of marker 10. One embodiment of the invention as shown in FIG. 5 of the drawings provides a directional offset 20 that is disposed near the lower end of staff 12 and is partially embedded in the ground. The upper above-ground segment of directional offset 20 provides directional indication, and the below-ground segment serves as an anchor to prevent rotation of marker 10 after installation. Directional offset 20 and anchor offset 22 can be arcuate shaped, circular angular, or some other departure from linear, and they provide a direction-indicating departure from the vertical straight segment(s) 18 of staff 12.

The primary purpose of directional offset 20 and directional angle pointer 24 is to indicate either the straight line direction or the corner angle configuration of the underground utility lines while eliminating the need for application of supplemental unsightly paint markings on the ground surface. Another objective of having anchor offset 22 embedded into the ground is to prevent rotation of marker 10, thus maintaining the directional integrity of marker 10 for the duration of the excavation activities.

The major advantages of this invention are:
(a) It is an extremely simple two-part marker consisting of only a flag having indicia and a supporting rod inserted into the ground at the underground utility location.
(b) The directional underground utility location marker of this invention is appropriate for one-time use and is disposable.
(c) This single-use marker can be made from inexpensive materials and can be inexpensively manufactured.

(d) This marker is versatile providing location information, directional information, utility type information, and owner company information. It can also be effectively used to mark other non-utility lines, borders, trails, or points wherever a highly visible, above-ground marker is needed.

(e) This marker can show the angle configuration of the underground utility lines where the lines change direction.

(f) This marker is a highly visible warning having indicia and a recognizable color or pattern corresponding to a particular type of utility and/or specific company owner.

(g) This marker can be sized and shaped to be convenient to use, yet is effective and readily noticeable.

(h) The marker can be easily and conveniently installed and removed when no longer needed.

(i) The marker is sufficiently durable to last for the duration of a typical construction project without the need for the marker to be replaced.

OPERATION AND USE OF THE INVENTION

Immediately prior to the beginning of excavation at a construction jobsite, the user will travel to the site and mark the location/direction of the underground utility lines that could potentially be damaged by the excavation activities. The temporary markers used are typically flag type markers. These flag markers are highly visible and present a clear warning of the presence of underground utility lines. The user will have detailed records and data pertaining to the location of these utility lines, and will insert individual markers into the ground directly above the lines at appropriate intervals. One-directional markers will be installed over straight lines, and two-directional markers will be installed at utility line corners or changes in direction. The two-directional markers are manufactured to designate a ninety degree corner but can easily be bent by the user at the excavation site to correspond to a corner angle other than ninety degrees. The markers are to be installed and directionally oriented with their staff offset segments corresponding or pointing to the direction of the associated underground utility lines. The user will visit the site periodically to ensure that sufficient markers remain in place to clearly designate the location and direction of the underground utility lines. When the excavation activities are complete the markers can be removed.

CONCLUSION

It should be understood that the phraseology or terminology employed herein is for purposes of description and not of limitation. The above description is considered that of the preferred embodiments only. While these embodiments of the invention have been shown on the drawings and described herein, it is to be understood that they are merely for illustrative purposes only and not intended to limit the scope of the invention. Workers skilled in the art will recognize additions, deletions, and other modifications that can be made in form and detail without departing from the spirit and scope of the invention. Thus, the scope of the invention should be determined by the appended claims, and not by the specific examples given.

Commonly used state-of-the-art temporary markers used to temporarily indicate the location of underground utility lines during periods of nearby excavation activities are typically limited to showing location information but not the direction of the lines. Consequently, supplemental unsightly paint markings are usually applied to the ground surface to provide the necessary directional information. At times when the ground cover is grass or snow, these paint markings may not remain for the desired duration. Conversely, on paved surfaces, these unsightly paint markings may endure well beyond their useful life. The present invention is a simple means of providing a flag marker with the important added capability of providing directional indication, thus eliminating the need for the application of unsightly supplemental paint markings to show the direction of the underground utility lines.

From the above-described features, it can be seen that this invention is unique and has a number of significant advantages over the prior art. It is a simple two-part utility line marker that provides utility line location information, but also provides the additional necessary information regarding the direction of these underground lines, thus eliminating the need for unsightly supplemental paint markings. It is easy and inexpensive to manufacture to the degree that it is appropriate for one-time use. Clearly, this invention is well adapted to meet the conditions of practical use, and it should be evident that this invention provides many advantages, is novel, and worthy of patentable merit over the prior art.

The invention claimed is:

1. A simple inexpensive disposable two-part directional utility location marker for temporary use during periods of nearby construction or digging activities, said location marker comprising a highly visible rectangular shaped warning flag of flexible fabric material, said flag being securely attached along one edge to an upright elongated staff, said staff having the cross-sectional configuration of a circular rod, the straight vertical length of said staff being aligned on a single vertical axis, said flag further comprising indicia to designate the type, owner company and other selected information pertaining to the associated underground utility lines, said staff comprising at least one substantially vertical straight segment and at least one directional offset portion of said staff disposed below said flag, said directional offset being an integral bent C-shaped segment of said staff projecting outwardly from said staff in order to provide said marker with both location and directional indication corresponding to the location and direction of the associated utility lines, the lower end of said marker to be inserted into the ground directly above the underground utility lines to mark their location and direction; wherein said staff further includes an integral bent C-shaped anchor offset portion, said anchor offset portion being offset outwardly in one direction from said single vertical axis of said staff and disposed near the lower end of said staff to be embedded into the ground to serve as an anchor in order to maintain directional integrity of said marker by preventing rotation of said marker after installation; wherein said staff further includes an integral directional angle pointer disposed at the top of said staff above said flag and formed by bending a single bend disposed at the upper portion of said staff to a horizontal position in order for said directional angle pointer to be used to point in a horizontal direction, said horizontal direction being disposed at a ninety degree angle to said directional offset in order to correspond to both horizontal legs of a ninety degree corner of the associated utility lines.

2. The directional utility location marker of claim 1 further wherein said staff is composed of steel material.

3. The directional utility location marker of claim 1 further wherein said staff is composed of plastic material.

4. The directional utility location marker of claim 1 wherein said staff further includes a second directional offset positioned above said lower directional offset and disposed at a ninety degree horizontal angle to said lower directional offset in order to correspond to a ninety degree corner of the associated utility lines.

5. The directional utility location marker of claim 4 further wherein said staff is composed of steel material.

6. The directional utility location marker of claim 4 further wherein said staff is composed of plastic material.

7. The directional utility location marker of claim 1 wherein said staff further includes an integral directional angle pointer disposed at the top of said staff above said flag and formed by bending the upper portion of said staff to a horizontal position in order for said directional angle pointer to be used to point in a horizontal direction, said horizontal direction being disposed at a ninety degree angle to said offset.

8. The directional utility location marker of claim 7 further wherein said staff is composed of steel material.

9. The directional utility location marker of claim 1 wherein said directional offset is disposed near the lower end of said staff and is partially embedded into the ground such that the upper above-ground portion of said directional offset serves as a directional pointer and the lower embedded portion of said directional offset serves as an anchor to prevent rotation of said marker.

10. The directional utility location marker of claim 9 further wherein said staff is composed of steel material.

11. The directional utility location marker of claim 9 further wherein said staff is composed of plastic material.

* * * * *